Figure 8:
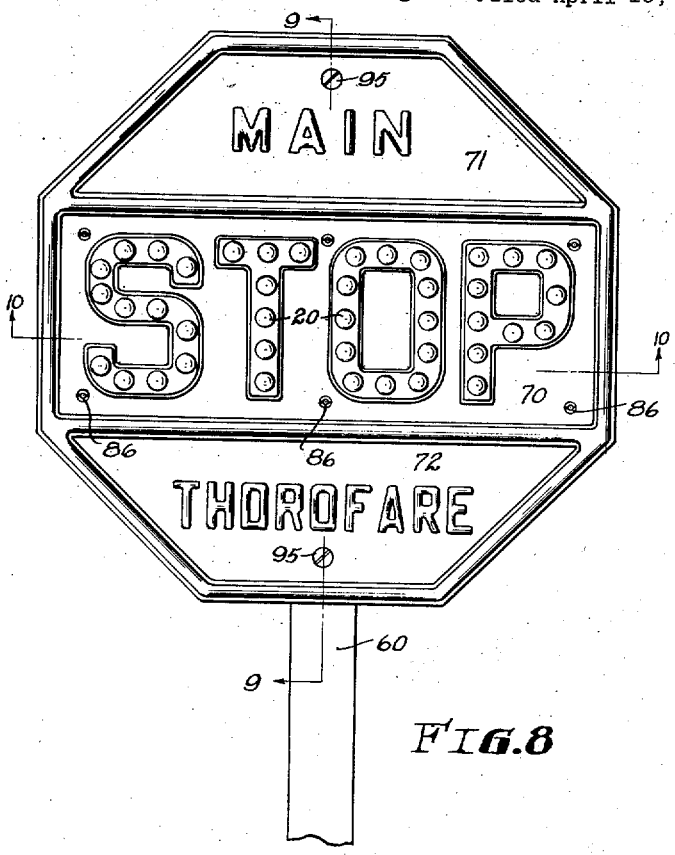

P. A. PREUS
April 26, 1932. HIGHWAY SIGN Re. 18,438
Original Filed April 16, 1930 2 Sheets-Sheet 1
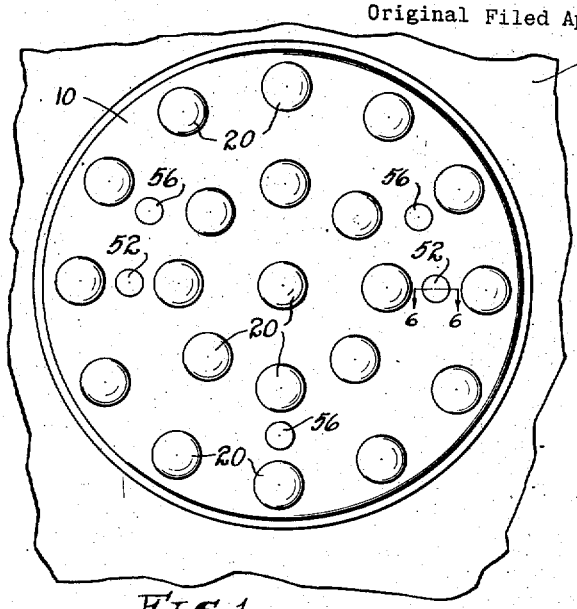
FIG. 1
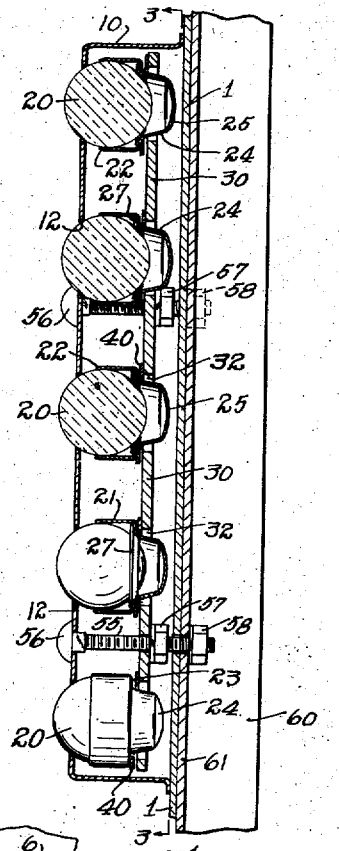
FIG. 2
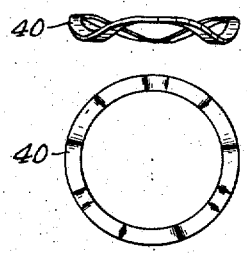
FIG. 4
FIG. 5
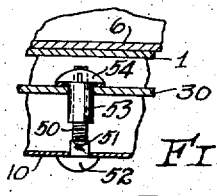
FIG. 6
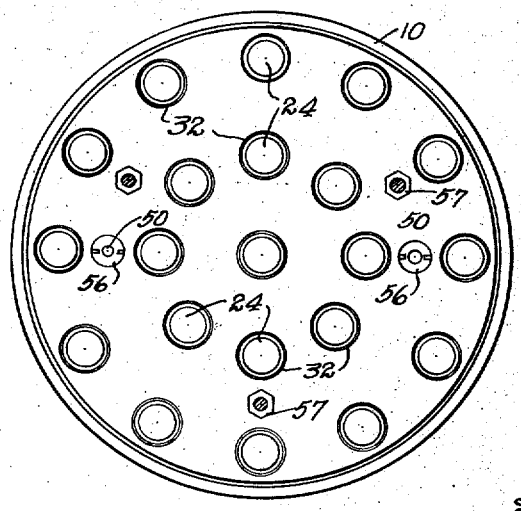
FIG. 3
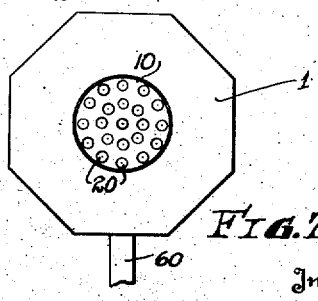
FIG. 7
Inventor
Paul A. Preus,
By Baker, Golrick & Teare,
Attorneys

P. A. PREUS

HIGHWAY SIGN

April 26, 1932.

Re. 18,438

Original Filed April 16, 1930 2 Sheets-Sheet 2

Inventor

Paul A. Preus

By Bates Golrick & Teare

Attorneys

Reissued Apr. 26, 1932

Re. 18,438

UNITED STATES PATENT OFFICE

PAUL A. PREUS, OF TACOMA, WASHINGTON, ASSIGNOR TO WESTERN STAMPING & MANUFACTURING COMPANY, OF CLEVELAND, OHIO, A CORPORATION OF MINNESOTA

HIGHWAY SIGN

Original No. 1,817,646, dated August 4, 1931, Serial No. 444,673, filed April 16, 1930. Application for reissue filed December 21, 1931. Serial No. 582,481.

This invention relates to a highway sign of the type having a series of reflecting units adapted to throw back rays received from an automobile headlight and thereby warn the driver. The object of the invention is to provide a very simple and efficient case for carrying the reflecting units suitably grouped either as a general warning panel or in the outline of suitable letters, as for example the word "Stop" or "Danger".

As illustrations of my invention, I have selected two embodiments which are shown in the drawings hereof, and are hereinafter more fully described, while the essential novel features of the invention are summarized in the claims.

Figure 9:
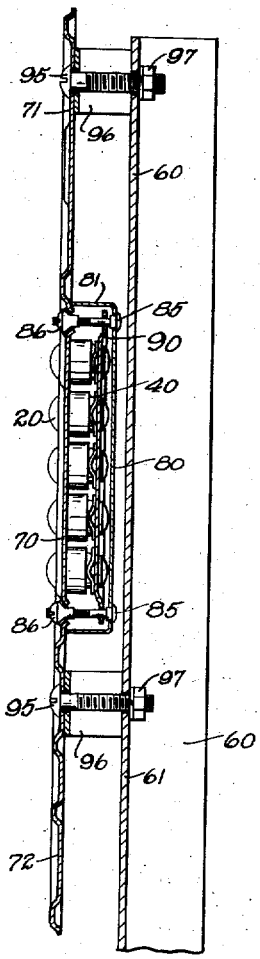
Figure 10:
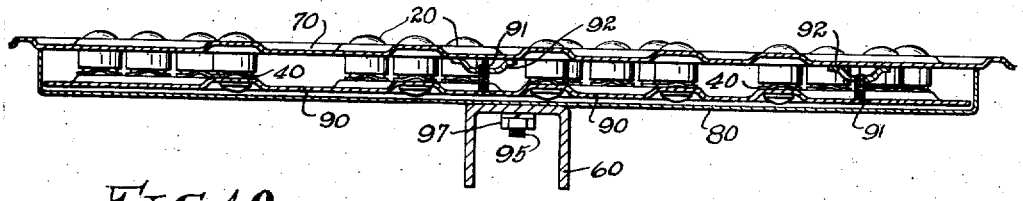

In the drawings, Fig. 1 is a front elevation of a portion of a sign having a reflecting panel embodying this invention; Fig. 2 is a diametric vertical section of parts of the sign shown in Fig. 1; Fig. 3 is a sectional rear elevation of the reflecting panel of this sign, the plane of the section being indicated by the line 3—3 on Fig. 2; Figs. 4 and 5 are respectively a side elevation and face view of an elastic washer which may be used for snugly positioning the individual reflectors in the reflecting panel; Fig. 6 is a detail illustrating locking bolts which assist in making a unit of the reflecting portion of the sign; Fig. 7 is a front elevation on a smaller scale of one form of complete sign; Fig. 8 is a larger view in front elevation of another form of complete sign; Figs. 9 and 10 are respectively a vertical section and a horizontal section on correspondingly numbered lines on Fig. 8.

Referring first to the embodiment of Figs. 1 to 7 inclusive, 1 indicates a suitable back panel and 10 a shallow drum-like casing carried thereby adapted to house a group of reflecting units indicated individually at 20. The casing 10 is shown as mounted centrally on the panel 1, which provides the back of the casing while leaving an exposed marginal region of the panel on which any suitable words may be displayed. The reflecting units, may, if desired, be of a red color, and the casing 10 may be red, so that the whole central region presents a red glare to the approaching automobile.

The reflecting units 20, as illustrated in the drawings, are a type common on the market, comprising spherical balls which may be of red glass and are individually mounted in metal housings 21. Each housing is shown as having a substantially cylindrical portion embracing the ball and peened inwardly just in front of its diameter as at 22. The other end of the cylindrical portion is shown as extended inwardly as at 23, and then continuing in a slightly conical portion 24 terminating in a dish-shaped base 25. This provides an annular shoulder to co-act with an intermediate plate having openings to receive the smaller portion of the housing, as hereinafter more fully described. The surface of the base 25 acts as a reflector tending to increase the reflection from the unit.

In my invention, I take a number of units as described and effectively mount them in the casing and hold them in place therein without danger of breaking the glass balls. To this end, I form through the face of the casing 10, a series of holes 12 of smaller diameter than the balls, and I provide a plate 30 which has holes 32 registering with the holes 12 and adapted to embrace the conical walls 24 of the unit housings, this plate therefore coacting with the shoulders on the units. Between the housing shoulder and the face of the positioning plate 30, I place, around the metal housing of each unit, a cushioning washer 40. This cushioning washer allows the positioning plate 30 to be bolted effectively to the casing front plate without danger of injuring the reflecting units and with the assurance that they will be tightly held in place.

The washer 40 is shown in detail in Figs. 4 and 5, and comprises an annular member which is made sinuous in a circumferential manner as shown. This washer may readily be made of spring metal, and thus is sufficiently yielding and operates to maintain the reflecting ball snugly in the opening 12 of the casing front.

The casing, the positioning plate, the reflecting units and the yielding washers are all secured together by any suitable means into one unitary device. For this purpose, I have shown bolts passing through the two plates. In Figs. 1 and 6, I have indicated two of such bolts comprising a threaded shank 50 equipped with a squared portion 51 and a rounded head 52. As a nut for such bolt, I may provide a member having an internally threaded sleeve 53 and a rounded head 54 provided with a suitable notch or notches. This nut member is shown as rotatably mounted in the plate 30.

In assembling the members of the entire reflecting device, using the parts described, the reflecting units may be placed in the holes 12 in the casing front, while the same is held horizontal, then the washers may be put on the shoulders of the unit housings and the plate 30 put into position. The bolts 50 may then be passed through the front and the nuts screwed in from the back. This makes a complete assembled reflecting member ready for mounting alone or on a sign panel as illustrated in Fig. 7.

I have illustrated a specific form of reflecting unit which I have found satisfactory. However, it should be noted, that one of the advantages of my sign is that various shapes and sizes of reflecting units may be employed. By making the holes in the positioning plate in registration with the holes in the front plate, I am enabled to hold such different units so that they will be maintained in position to be visible through the openings in the front plate. It is convenient to have the holes in the positioning plate of the same size as those in the front plate, but this is not necessary, as registration of the centers or corresponding points in the two sets of holes may be sufficient to insure proper positioning the units. As shown in Fig. 2, the positioning plate stands well within the border flange of the casing, and thus the identical plate shown might be used with larger units, by simply standing farther back in the casing.

My reflecting device may be mounted on the sign panel 1 by any suitable means, as for instance bolts passing through the casing 10. I have shown three of these through bolts, indicated at 55, having heads 56 on the front of the casing and extending through the positioning plate where they first receive nuts 57 (Fig. 2) clamped against the back of such plate and extend beyond such nuts to pass through the sign panel 1, finally carrying nuts 58 holding the reflecting device to the sign panel.

I have indicated at 60 a metal supporting post for the sign having a front wall or flange 61. I have shown in Fig. 2 the bolts 55 passing through this front wall, so that these same bolts hold the casing to the sign panel and both the casing and panel to the post.

In Figs. 8, 9 and 10, I have illustrated my invention embodied in a sign where the reflecting units are the same as already described, but are grouped in the form of certain letters, as for instance the letters making the word "Stop". The outline of these letters is preferably made more definite, either by embossing them on the panel, or distinctively painting them, or both.

In this second embodiment, I make the front of the casing for the reflecting units and the marginal sign proper in one plane; that is to say, the central zone of the front plate designated 70 constitutes the front of the casing for the reflecting units, while the marginal portions 71 and 72 are parts of the sign beyond the reflecting region. I provide behind the group of reflecting units a suitable box-like casing 80 having edge flanges 81 which abut the back of the front panel, the casing being held to the panel by bolts and nuts. The bolts 85 are shown as passing through the back 80 of the casing and receiving nuts 86 which are screwed onto the bolts in front of the front plate 70.

The reflecting units 20 are carried in the sign just described in the same manner as already explained; that is to say, the glass spheres project partially through openings in the front plate 70 and the reduced shanks of the individual housings for these spheres extend through a positioning plate 90, with intermediate sinuous spring washers 40. The plate 90 may be held in proper relation to the front plate by any suitable means; I have shown screws 91 passing through the plate 90 into internally threaded stirrups 92 which are electrically welded to the back of the front plate 70. In this manner, the reflecting units are effectively held in place on the front plate before the casing 80 is applied.

I have shown the sign of Fig. 8 secured to a suitable post 60 by means of bolts 95 passing through the panel portions 71, 72 and through intermediate distance passes 96 and receiving units 97 behind a front wall 61 of the post.

It will be noticed that the embodiment illustrated in Figs. 8 and 9 is in a sense a reversal of the embodiment of Figs. 1 and 2; that is to say, in Figs. 8 and 9 the main panel constitutes the front of the casing for the units, the wall of which abuts the rear face of the panel, while in Figs. 1 and 2 the main panel constitutes the back of the casing, the casing wall abutting the front of this panel. In either case there is the intermediate plate, which positions the units by reason of embracing a smaller portion thereof and bearing against a shoulder provided by a larger portion, the unit being confined by reason of its larger portions being clamped by the positioning plate and the plate on the other side of such larger portion.

It will be seen that in both of the illustrated embodiments of my invention the reflecting units are similarly held in position in registration with openings in the metal front. While it is preferable for the units to be rounded and project through and beyond the openings in the front plate, this is not strictly necessary, provided they are in such registration with the openings as to receive the rays of light thrown on the sign front. I find it very convenient in manufacture to make the openings in the front and the corresponding openings through the positioning plate of the same diameter, as thus both sets of openings may be made by the same tool and absolute registration at the front and rear insured. My method of holding the reflecting units causes them to be retained firmly in place without danger of breakage. Should, however, one be broken by external means, it is a simple matter to separate the casing and replace any broken unit.

I claim:

1. A highway sign, comprising a front plate having a series of holes through it, a back plate, a surrounding annular wall connecting the front and back plates, reflecting units registering with the holes in the front plate, an intermediate plate having a set of holes embracing the respective units, and means for holding all of the parts together.

2. In a sign of the character described, the combination of a front plate having openings therein, reflecting units each having a reflecting portion and a casing with a reduced shank, a plate at the rear of the front plate having openings positioned with reference to those of the front plate, said units being mounted between the plates with the reflecting portion registering with the front plate and the shanks extending through the second mentioned plate, and means for holding the front and the rear plate together.

3. In a sign of the character described, the combination of a front plate having a series of round openings therein, a plate at the rear of the front plate having openings correspondingly positioned, a series of reflecting units each comprising a glass ball and a metal housing which embraces the ball and then has an inwardly directed shoulder and then a projecting shank, sinuous washers embracing the shanks, the glass balls projecting through the openings in the front plate and the shanks behind the washers projecting through openings in the second mentioned plate, and means for holding the plates together with the sinuous washers under constraint to maintain the glass balls tight in the openings of the front plate.

4. In a sign of the character described, the combination of a casing and a group of reflecting units therein, the casing having a series of openings through its front, a plate behind the reflecting units with correspondingly positioned openings, the units registering with the front openings and extending through the openings in the plate at the rear thereof, and means for holding together the front and back of the casing, said sign having a panel extending beyond the region of the reflecting portion and adapted to carry suitable indicia on such marginal portion.

5. In a sign of the character described, the combination of a series of reflecting units, an enclosing casing therefor having a front member, a back member and a surrounding wall, the front member of the casing having openings, an intermediate plate within the casing having openings in registration with openings in the front member, the reflecting units being within the casing and projecting through the front member thereof and having portions projecting through the intermediate plate, means for holding the intermediate plate in fixed relation to the front member and back member, and means for holding such entire group in a certain region of a sign panel which has marginal portions for suitable indicia.

6. In a sign of the character described, the combination of a series of reflecting units, an enclosing casing therefor having a front member, a back member and a surrounding wall, the wall being formed integral with one of said members and at its free edge abutting the other member, the front member of the casing having openings, an intermediate plate within the casing having openings in registration with openings in the front member, the reflecting units projecting through the front member and having housings with shanks projecting through the intermediate plate, means for holding the intermediate plate to the front member to confine the reflecting units as a group, and means for mounting the entire reflecting device.

7. In a sign of the character described, the combination of a panel member carrying suitable sign indicia and having a group of openings therein, a member at the rear thereof having openings corresponding in position to the openings in the panel member, a plurality of reflecting units, said units projecting through the panel openings and having housings with shanks projecting through the rear member, means for securing the rear member to the panel member, whereby said reflecting units are securely held in place, and there being an enclosing casing for said units.

8. In a sign of the character described, the combination of a panel member, said member having a series of openings therein, a corresponding series of reflecting units projecting through said openings, a member at the rear of the panel member having sinuous washers associated therewith for holding said reflecting units in place, and a box-like member associated with the back of the panel member for enclosing said reflecting units.

9. In a sign of the character described, the combination of a panel member, a series of reflecting units, an enclosing casing for said units, said casing having a front member and a side wall formed integral therewith, the front member having a plurality of openings, a plate member within the casing having openings in registration with the openings in the front member, the reflecting units projecting through the front member and having housings with shanks projecting through the plate member, means for holding the plate member to the panel member, to confine the reflecting units as a group, said means acting also as a means for mounting the casing to the panel member.

10. A sign having a group of reflecting units, said units each having a reflecting portion and a casing with a reduced shank, a front plate with openings registering with the units, a plate at the rear of the front plate, means for securing the plates together, and yielding washers surrounding the shanks of the units and positioned between the plates, said washers being adapted to protect the reflecting units when the two plates are secured together, as well as to securely hold them against the front plate.

11. In a sign of the character described, the combination of a front plate having openings therein, reflecting units each having a reflecting portion and a casing with a reduced shank, a plate at the rear of the front plate having openings positioned with reference to those of the front plate, said units being mounted between the plates with the reflecting portions extending through the front plate and the shanks of the casing extending through the rear plate, means for holding the plates together, and yielding washers surrounding the shanks between the shoulders thereon and the rear plate, whereby the reflecting units are protected from injury, but at the same time securely held against the front plate.

12. In a sign of the character described, the combination of a front plate having openings, a series of reflecting units each comprising a glass ball and a metal housing with a reduced shank, a plate at the rear of the front plate having openings registering with those of the front plate, the glass balls extending partially through the openings in the front plate and the shank extending through the openings in the rear plate, means for holding the front and rear plates together and yielding washers surrounding the shanks between the shoulders thereon and the rear plate, to protect the glass balls from injuries, as well as to hold them securely against the front plate.

13. In a sign of the character described, the combination of a front plate, having openings, reflecting units positioned behind the front plate and registering with the openings therein, said reflecting units having reduced shanks and shoulders caused by said reduction, and means for holding the units in place, including sinuous washers surrounding the shanks and adapted to act upon the shoulders thereof and a plate against which the washers bear.

14. In a sign, the combination of a front plate, having openings through it, an imperforate back plate suitably connected to the front plate and spaced some distance behind it, reflecting units housed between the front and back plates and comprising glass members registering with the openings through the front plate and housings secured to the glass members and forming reflectors behind them, and a perforated plate between the front and back plates coacting with the housings for positioning the units.

15. In a sign, the combination of a front plate having openings through it, a back plate, an annular wall leading from one plate to the other to surround an open space between them, reflecting units between the plates having glass front portions registering with the openings in the front plate and having housings at their rear providing internal reflectors and external shoulders, and a perforated positioning plate between the plates mentioned embracing the units and coacting with said shoulders.

16. In a sign of the character described, the combination of a front plate having a series of round openings therein, a series of reflecting units each comprising a glass ball of greater diameter than the corresponding opening in the front plate, and a metal housing which embraces the ball and then has an inwardly directed shoulder and then a projecting shank, the glass balls projecting only partly through the openings in the front plate, and a plate having openings surrounding the shanks and engaging the shoulders to maintain the glass balls in the openings of the front plate.

17. In a sign, the combination of a front plate having a series of openings through it, a series of reflecting units, each comprising a glass portion with a convex front of greater diameter than the corresponding opening in the front plate and having a reduced rear shank providing a rearwardly facing annular shoulder, and a plate behind the front plate having openings surrounding the shanks of the units, the last mentioned plate coacting with the annular shoulders of the units to hold them with a portion only of their convex fronts projecting through the openings of the front plate.

Signed at Tacoma, Washington, this 11th day of December, 1931.

PAUL A. PREUS.